G. E. Eastman,
Pail Ear.

N° 80,341 Patented July 28, 1868.

Witnesses:
Wm A. Magaw
G. W. Cotton

Inventor:
G. E. Eastman
per Munn&Co
Attorneys

United States Patent Office.

GEORGE E. EASTMAN, OF WASHINGTON MILLS, NEW YORK.

Letters Patent No. 80,341, dated July 28, 1868.

IMPROVEMENT IN PAIL-EARS.

The Schedule referred to in these Letters Patent and making part of the same.

TO ALL WHOM IT MAY CONCERN:

Be it known that I, GEORGE E. EASTMAN, of Washington Mills, in the county of Oneida, and State of New York, have invented a new and improved Pail-Ear; and I do hereby declare that the following is a full, clear, and exact description thereof, which will enable those skilled in the art to make and use the same, reference being had to the accompanying drawings, forming part of this specification.

This invention relates to an improvement in bail-ears for pails or buckets and for other vessels of a similar construction, whereby they are rendered much more durable than the ordinary pail-ear.

And the invention consists in forming the ear with a branch exterior stay and an interior stay, which are connected with the main plate of the ear, whereby the main plate is guarded and protected from injurious lateral strain, and rendered strong and durable, as will hereinafter be more fully described.

Similar letters of reference indicate corresponding parts.

A is the main plate of the ear, which is fastened by a nail or screw to the outside of the pail.

Figure 1:
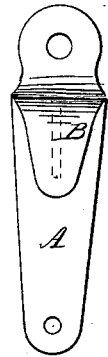
Figure 1 represents the ear detached, it being a side view, as from the inside of a pail, showing the exterior stay and the position of the interior stay in dotted lines.
Figure 2:
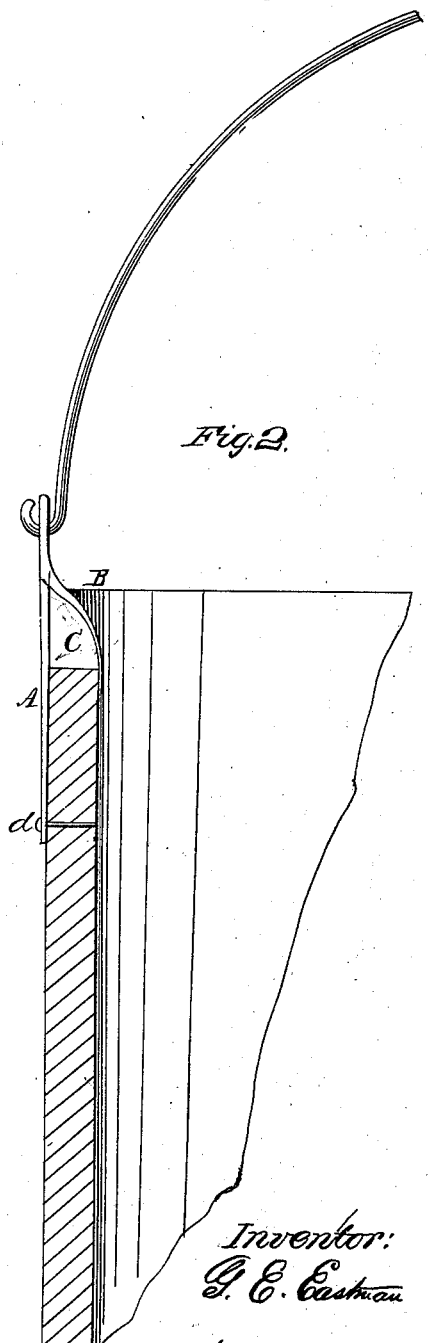
Figure 2 is an edge view of the ear, showing the manner of its attachment to a pail, the pail being shown in red color.

B is the exterior branch-stay, which fits over and encloses the edge of the pail, as seen in fig. 2.

C is the interior stay, which is a thin plate, extending at right angles with A and B, from one to the other, connecting the two, and rendering the ear stiff and strong.

In applying the ear to a pail, a slit is made with a saw in the side of the pail, which the stay C enters, and the ear is driven down to the position seen in the drawing, when it is fastened by a nail or screw through the main plate A, as seen at d.

The ear may be made of malleable iron or brass casting or of any other suitable metal.

Having described my invention, I claim as new, and desire to secure by Letters Patent—

A pail-ear, constructed substantially as and for the purposes herein shown and described.

The above specification of my invention signed by me, this 18th day of May, 1868.

GEORGE E. EASTMAN.

Witnesses:
W. W. CHAPMAN,
DAVID HUGHES.